US008068385B2

(12) United States Patent
Jiang

(10) Patent No.: US 8,068,385 B2
(45) Date of Patent: Nov. 29, 2011

(54) SYSTEM AND METHOD FOR ENHANCING WEAK TARGET SIGNALS FOR A SENSOR ARRAY

(75) Inventor: Qin Jiang, Woodland Hills, CA (US)

(73) Assignee: Raytheon Company, Waltham, MA (US)

( * ) Notice: Subject to any disclaimer, the term of this patent is extended or adjusted under 35 U.S.C. 154(b) by 469 days.

(21) Appl. No.: 12/313,741

(22) Filed: Nov. 24, 2008

(65) Prior Publication Data

US 2010/0128566 A1    May 27, 2010

(51) Int. Cl.
*G01S 15/00* (2006.01)
(52) U.S. Cl. .......................................... 367/97
(58) Field of Classification Search ............ 367/97, 367/11, 88, 87
See application file for complete search history.

(56) References Cited

U.S. PATENT DOCUMENTS

| | | | |
|---|---|---|---|
| 4,420,824 | A | 12/1983 | Weber |
| 4,549,286 | A | 10/1985 | Langeraar et al. |
| 4,933,914 | A | 6/1990 | Feintuch et al. |
| 5,216,640 | A | 6/1993 | Donald et al. |
| 5,457,662 | A | 10/1995 | Forster |
| 5,481,505 | A | 1/1996 | Donald et al. |
| 5,914,912 | A | 6/1999 | Yang |
| 6,130,641 | A | 10/2000 | Kraeutner et al. |
| 6,424,596 | B1 | 7/2002 | Donald |
| 6,525,994 | B2 | 2/2003 | Donald et al. |
| 2004/0071046 | A1 | 4/2004 | Kervern et al. |
| 2006/0007784 | A1 | 1/2006 | Lerro et al. |
| 2006/0133211 | A1 | 6/2006 | Yang |
| 2010/0128566 | A1* | 5/2010 | Jiang ............................... 367/87 |
| 2011/0128819 | A1 | 6/2011 | Jiang |

OTHER PUBLICATIONS

Kadambe et al.; "Application of Cross-Term Deleted Wigner Representation (CDWR) for Sonar Target Detection/Classification;" Conference Record of the $32^{nd}$ Asilomar Conference on Signals, Systems and Computers, vol. 1; Nov. 1-4, 1998; pp. 822-826.

Kadambe et al.; "Instantaneous Frequency Estimation Using the Cross-Term Deleted Wigner Representation (CDWR);" Proceedings of the IEEE-SP International Symposium on Time-Frequency and Time-Scale Analysis, Jun. 18-21, 1996; pp. 289-292.

Jiang et al.; Active Sonar and Active Sonal Method Using Hoise Reduction Techniques and Advanced Signal Processing Techniques; U.S. Appl. No. 12/465,127, filed May 13, 2009; 48 pages.

Kadambe et al.; "Cross Term Deleted Wigner Representation (CDWR) Based Signal Detection Methodologies;" Acoustics, Speech and Signal Processing, 1996; ICASSP-96; Conference Proceedings; 1996 IEEE International Conference; May 7-10, 1996; vol. 5; pp. 2583-2586.

Kadambe et al.; "Comparative study of the Cross-term Deleted Wigner and Cross Biorthogonal representations;" Signals Systems and Computers, 1997; Conference Record of the $31^{st}$ Asilomar Conference; vol. 2; Nov. 2-5, 1997; pp. 1484-1488.

Office Action dated Jul. 8, 2011 for U.S. Appl. No. 12/465,127; filed May 13, 2009; 17 pages.

* cited by examiner

*Primary Examiner* — Daniel Pihulic
(74) *Attorney, Agent, or Firm* — Daly, Crowley, Mofford & Durkee, LLP

(57) ABSTRACT

A system and a corresponding method used with a sensor array selects candidate weak target signals from within one or more received signals and enhances those candidate weak target signals relative to a noise background.

37 Claims, 10 Drawing Sheets

SYSTEM AND METHOD FOR ENHANCING WEAK TARGET SIGNALS FOR A SENSOR ARRAY

FIELD OF THE INVENTION

This invention relates to a system and method for enhancing weak target signals for a sensor array.

BACKGROUND OF THE INVENTION

In sensor array systems, such as forward-looking sonar systems, or similar type systems, the signals returned from candidate targets include both strong and weak return signals. Strong signals are typically processed by the sensor array without much problem. However, the weak target signals returned from the target have a low average signal amplitude and are typically very noisy, e.g., weak return sonar target signals from undersea mines are often very noisy due to the complicated undersea environment. In order to detect candidate targets from weak noisy return signals, pre-processing is often performed prior to detection to reduce the noise. Some conventional methods to reduce the noise of weak target signals use a technique known as signal subspace projection. Conventional signal subspace processing techniques are typically based on the assumption that the return target signals have greater energy than the noise of the return signals. However, for weak target signals, this assumption is typically not correct. The result is conventional signal subspace projection pre-processing techniques are often not effective at reducing noise which reduces the ability of the sensor array system to detect candidate targets.

Additionally, many conventional thresholding techniques which rely on the threshold amplitudes of signals to determine the location of candidate target assume the noise of the return signals is Gaussian distributed. However, in many applications, such as undersea mine detection, the noise is both Gaussian and non-Gaussian distributed. The result is conventional thresholding techniques do not always detect candidate targets and often generate a lot of false target signals. Moreover, non-Gaussian distribution of the noise is very difficult to estimate and requires extensive computational efforts. Thus, non-Gaussian distribution estimation is rarely, if ever, utilized by conventional thresholding techniques.

Current sensor array systems, such as forward-looking sonar systems, and the like, require the individual sensors of the array to be located in very close proximity to each other due to the physical limitation of the size of the array. Such a configuration often results in a target signal contacting several adjacent sensors simultaneously. This results in a correlation between the target signals received by various sensors of the array, referred to herein as cross-sensor correlations. The inventor hereof has discovered a new method for enhancing weak target signals which exploits such cross-sensor correlations.

SUMMARY OF THE INVENTION

It is therefore an object of this invention to provide a method for enhancing weak target signals for a sensor array.

It is a further object of this invention to provide such a method which effectively enhances weak candidate target signals.

It is a further object of this invention to provide such a method which provides for more accurate detection of candidate targets.

It is a further object of this invention to provide such a method which reduces false target signals.

It is a further object of this invention to provide such a method which exploits cross-sensor correlations to enhance weak candidate target signals.

It is a further object of this invention to provide such a method which can locate all candidate target locations from weak candidate target signals.

It is a further object of this invention to provide such a method which accommodates both Gaussian and non-Gaussian noise distribution for detecting weak target signals.

The subject invention, however, in other embodiments, need not achieve all these objectives and the claims hereof should not be limited to structures or methods capable of achieving these objectives.

This invention features a method for enhancing weak target signals for a sensor array, the method including: a) determining the locations of weak candidate target signals using one or more adaptive thresholding processes, b) extracting a wave profile of a center beam signal of a weak candidate target signal and adjacent beam signals of the weak candidate target signal using a local signal profile window, c) determining cross-beam correlations between an extracted wave profile of the center beam signal and extracted wave profiles of the adjacent beam signals and between extracted wave profiles of adjacent beam signal profiles based on the similarity of the wave profiles to determine the occurrence of a weak candidate target signal and compute a set of weighting factors, d) enhancing the center beam signal of the weak candidate target signal based on the correlations and the set of weighting factors, and e) repeating steps b) through d) for each of the weak candidate target signals to provide enhanced weak candidate target signals.

In one embodiment, the one or more adaptive thresholding processes may include an adaptive thresholding process which extracts a histogram for each of the weak candidate target signals which approximates the noise distribution around a weak candidate target signal using at last one local noise window and uses that histogram to set threshold values for the adaptive thresholding process. The one or more adaptive thresholding processes may accommodate Gaussian noise and non-Gaussian noise. The one or more adaptive thresholding processes may include adaptive thresholding process which utilizes a set of noise samples from a noise window around each of the weak candidate target signals to estimate a high order statistic of the noise samples and uses that estimate to set threshold values for the adaptive processes. The high order static may include Kurtosis static. The one or more adaptive thresholding processes may accommodate Gaussian noise and non-Gaussian noise. The method may include a winner-take-all weighting process which may include determining the adjacent beam signal having the highest cross-beam correlation between the center beam signal and the adjacent beam signals and may have the highest amplitude and replacing the center beam signal with that adjacent beam signal to provide an enhanced weak candidate target signal. The method may further include a weighted-average weighting process which may include determining a weighted sum of the center beam signal and the adjacent beam signals based on previously determined the cross-beam correlations and replacing the center beam signal with a signal representing the weighted sum to provide an enhanced weak candidate target signal. The sensor array may include a forward-looking sonar array.

This invention also features a method for enhancing weak target signals for a sensor array, the method including: a) determining the locations of weak candidate target signals using an adaptive thresholding process which includes extracting a histogram of the weak candidate target signal which approximates the noise distribution around the weak candidate target signal using a local noise window and using that histogram to set threshold values for the adaptive thresholding processes, b) extracting a wave profile of a center beam signal of a weak candidate target signal and adjacent beam signals of the weak candidate target signal using a local signal profile window, c) determining cross-beam correlations between an extracted wave profile of the center beam signal and extracted wave profiles of the adjacent beam signals and determining correlations between extracted wave profiles of adjacent beam signal profiles based on the similarity of the wave profiles to determine the occurrence of a weak target signal in the adjacent beam signals to compute a set of weighting factors, d) enhancing the center beam signal of the weak target signal based on the correlations and the set of weighting factors, and e) repeating steps b) through d) for each of the weak candidate target signals to provide enhanced weak target signals.

This invention further features a method for enhancing weak target signals for a sensor array, the method including: a) determining the locations of weak candidate target signals using an adaptive thresholding processes which includes using a set of noise samples from a noise window around the weak candidate target signal to estimate a high order statistic of the noise samples and using the estimate to set threshold values for the adaptive processes, b) extracting a wave profile of a center beam signal of a weak candidate target signal and adjacent beam signals of the weak candidate target signal using a local signal profile window, c) determining cross-beam correlations between an extracted wave profile of the center beam signal and extracted wave profiles of the adjacent beam signals and determining correlations between extracted wave profiles of adjacent beam signal profiles based on the similarity of the wave profiles to determine the occurrence of a weak target signal in the adjacent beam signals to compute a set of weighting factors, d) enhancing the center beam signal of the weak target signal using the correlations and the set of weighting factors, and e) repeating steps b) through d) for each of the weak candidate target signals to provide enhanced weak target signals.

This invention further features a system for enhancing weak target signals for a sensor array including a pre-processing engine responsive to buffer data from a sensor array configured to: a) determine the locations of weak candidate target signals using one or more adaptive thresholding processes, b) extract a wave profile of a center beam signal of a weak candidate target signal and adjacent beam signals of the weak candidate target signal using a local signal profile window, c) determine cross-beam correlations between an extracted wave profile of the center beam signal and extracted wave profiles of the adjacent beam signals and between extracted wave profiles of adjacent beam signal profiles based on the similarity of the wave profiles to determine the occurrence of a weak candidate target signal and compute a set of weighting factors, d) enhance the center beam signal of the weak candidate target signal based on the said correlations and said set of weighting factors, and e) repeat steps b) through d) for each of the weak candidate target signals to provide enhanced weak candidate target signals.

In one embodiment, the one or more adaptive thresholding processes may include an adaptive thresholding process which extracts a histogram for each of the weak candidate target signals which approximates the noise distribution around a weak candidate weak target signal using at last one local noise window and uses that histogram to set threshold values for the adaptive thresholding process. The one or more adaptive thresholding processes may accommodate Gaussian noise and non-Gaussian noise. The one or more adaptive thresholding processes may include adaptive thresholding process which utilizes a set of noise samples from a noise window around each of the weak candidate target signals to estimate a high order statistic of the noise samples and uses that estimate to set threshold values for the adaptive processes. The high order static may include Kurtosis static. The system may include a winner-take-all weighting process which includes determining the adjacent beam signal having the highest cross-beam correlation between the center beam signal and the adjacent beam signals and having the highest amplitude and replacing the center beam signal with that adjacent beam signal to provide an enhanced weak candidate target signal. The system may include a weighted-average weighting process which includes determining a weighted sum of the center beam signal and the adjacent beam signals based on previously determined said cross-beam correlations and replacing the center beam signal with a signal representing the weighted sum to provide an enhanced weak candidate target signal. The sensor array may include a forward-looking sonar array. The pre-processing engine may include a computer program embodied on computer readable medium.

This invention also features a system for enhancing weak target signals for a sensor array including a pre-processing engine responsive to buffer data from a sensor array configured to: a) determine the locations of weak candidate target signals using an adaptive thresholding process which includes extracting a histogram of the weak candidate target signal which approximates the noise distribution around the weak candidate weak target signal using a local noise window and using that histogram to set threshold values for the adaptive thresholding processes, b) extract a wave profile of a center beam signal of a weak candidate target signal and adjacent beam signals of the weak candidate target signal using a local signal profile window, c) determine cross-beam correlations between an extracted wave profile of the center beam signal and extracted wave profiles of the adjacent beam signals and determining correlations between extracted wave profiles of adjacent beam signal profiles based on the similarity of the wave profiles to determine the occurrence of a weak target signal in the adjacent beam signals to compute a set of weighting factors, d) enhance the center beam signal of the weak target signal based on the said correlations and said set of weighting factors, and e) repeat steps b) through d) for each of the weak candidate target signals to provide enhanced weak target signals.

This invention also features a system for enhancing weak target signals for a sensor array including a pre-processing engine responsive to buffer data from a sensory array configured to: a) determine the locations of weak candidate target signals using an adaptive thresholding processes which includes using a set of noise samples from a noise window around the weak candidate target signal to estimate a high order statistic of the noise samples and using the estimate to set threshold values for the adaptive processes, b) extract a wave profile of a center beam signal of a weak candidate target signal and adjacent beam signals of the weak candidate target signal using a local signal profile window, c) determine cross-beam correlations between an extracted wave profile of the center beam signal and extracted wave profiles of the adjacent beam signals and determining correlations between extracted wave profiles of adjacent beam signal profiles based on the similarity of the wave profiles to determine the occurrence of a weak target signal in the adjacent beam signals to compute a set of weighting factors, d) enhance the center beam signal of the weak target signal using said correlations and said set of weighting factors, and e) repeat steps b) through d) for each of the weak candidate target signals to provide enhanced weak target signals.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
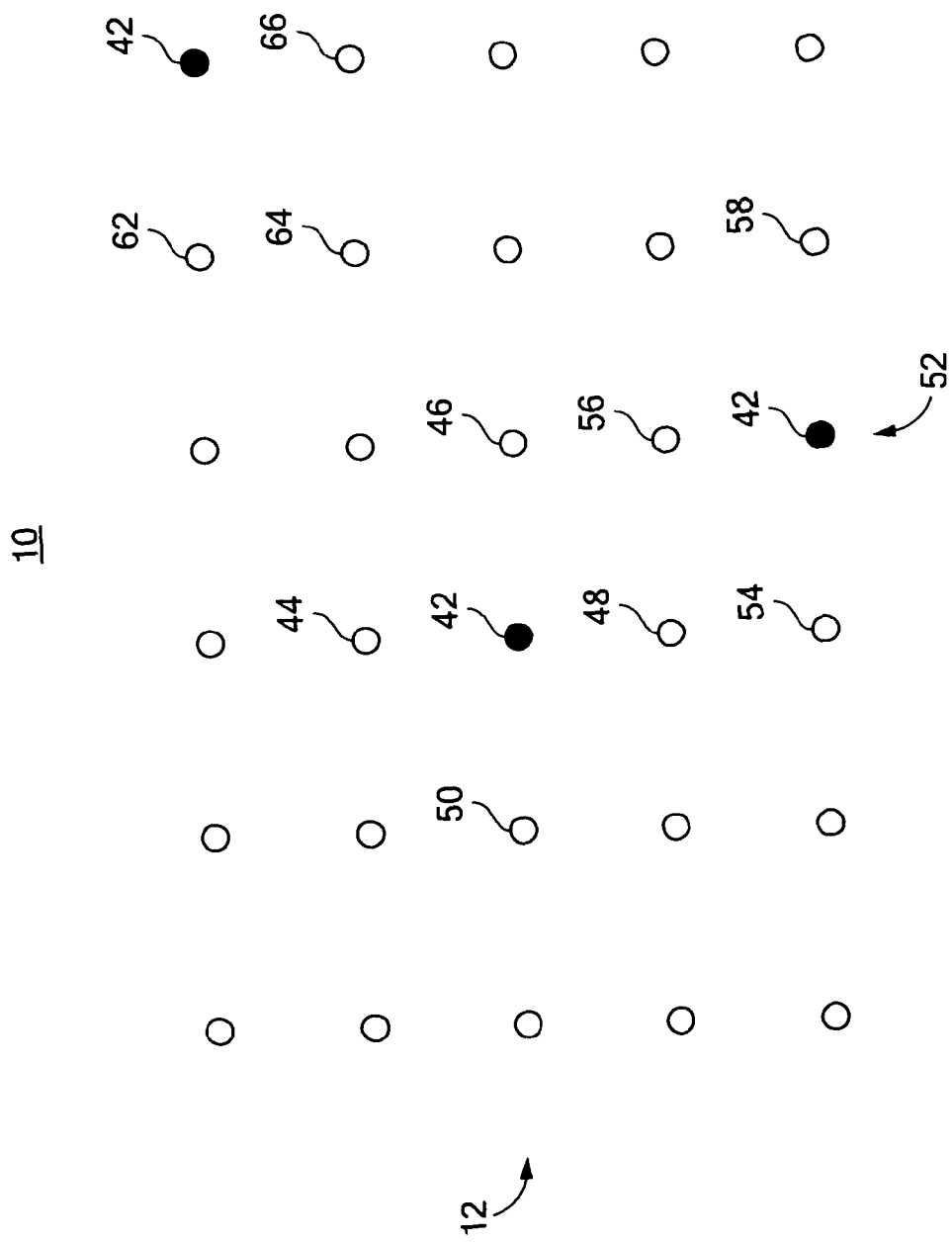
FIG. 1 is a schematic top view of a typical sensor array used to detect target signals from candidate targets.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1, sensor array 10 which may be utilized in a sensor array system, such as a forward-looking sonar system, or similar type sensor array system. Array 10 includes a plurality of sensors 12, e.g., an array of 30 sensors having five rows of six sensors each. Array 10 may have any number of sensors arranged in any predetermined configuration. Each of plurality of sensors 12 may be acoustic sensors, radar sensors, LIDAR sensors, radar-LIDAR sensors, or similar type sensors. Each of the plurality of sensors 12 are responsive to return target signals which may include both strong and weak target signals depending on the noise environment and distance from the target to array 10. When senor array 10 receives strong return target signals those signals are processed by each of sensors 12 of array 10 are detected by detectors, which is not part of this invention and not discussed here. However, when the return signals from the targets include weak target signals, it is the goal of this invention to enhance those weak target signals to provide for more accurate detection of all candidate targets and to reduce false target signals. In this example, the weak return target signals may be contained in some of 30 beam signals which each correspond to one of the 30 sensors of the plurality of sensors 12 in array 10. Typically, not all of the sensors of the plurality of sensors 12 see the same target simultaneously; the returned signal from the target are usually only picked up by some of the sensors of array 10. Each sensor of the plurality of sensors 12 generates a beam signal or beam data, which may contain weak target signals. As defined herein, a weak target signal is a one-dimensional signal that has a peak value less than the background noise, which makes them difficult to detect. In accordance with this invention, the beam signals output from each of the plurality of sensors 12 of array 10 are pre-processed to enhance the weak target signals returned from candidate targets.

Because of the physical limitation of the size of array 10, the distance between each of the plurality of sensors 12 is typically very small, e.g., such that the beam patterns of adjacent sensors will overlap each other because the distance between the sensors is small compared to the beam width. As a result of such small distances, weak candidate target signals, e.g., mine contacts returned from an undersea mine, or similar type signals, are often seen by several adjacent sensors of array 10 simultaneously, as discussed above. Thus, the beam signals received at adjacent sensors may be correlated to each other. In accordance with this invention, this correlation is exploited to enhance weak candidate target signals, as discussed in further detail below.

Figure 2:
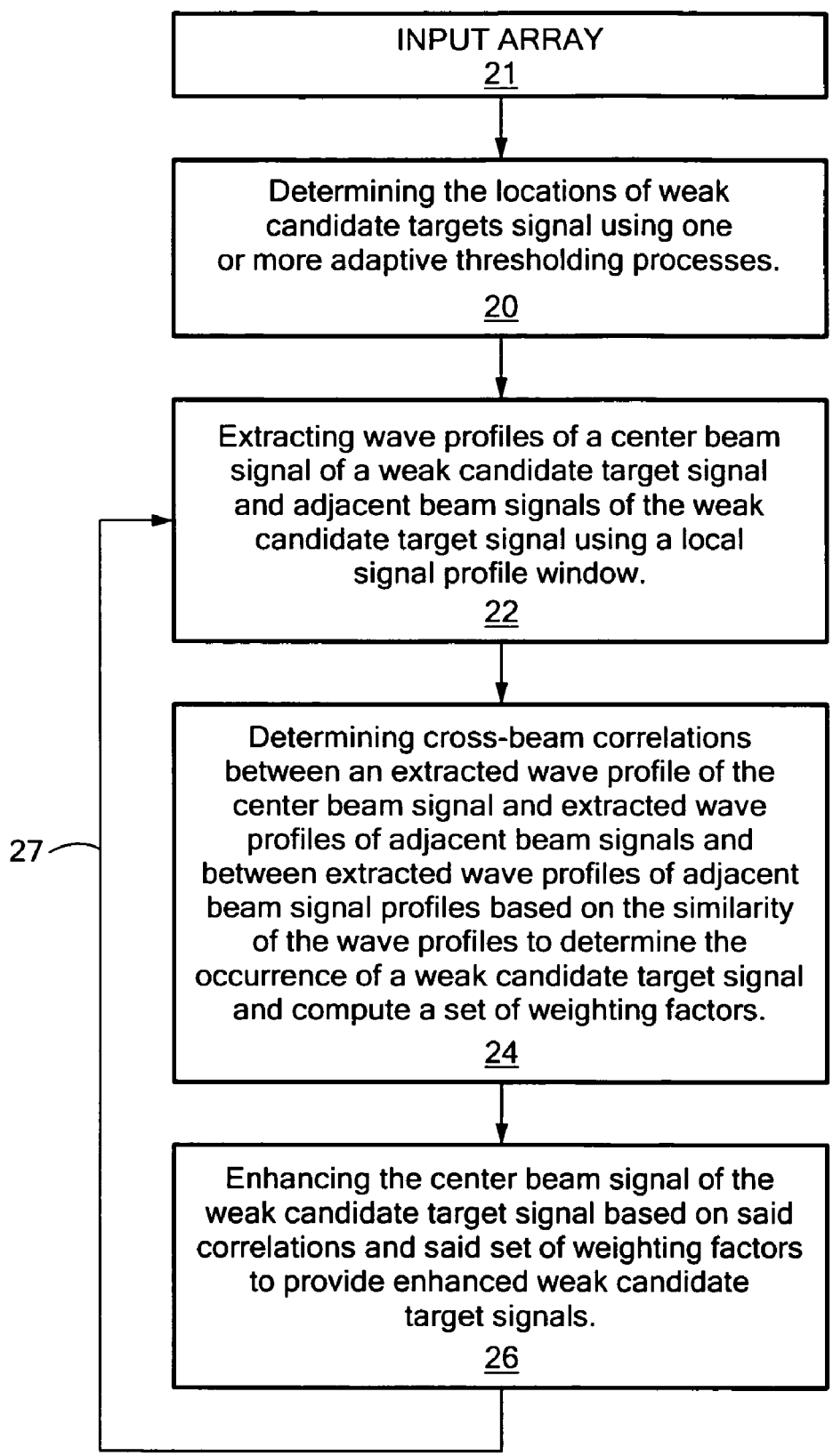
FIG. 2 is a schematic block diagram showing the primary steps of one embodiment of the method for enhancing weak target signals for a sensor array of this invention.

One exemplary embodiment method for enhancing weak target signals for a sensor array of this invention includes determining the locations of weak candidate target signals using one or more adaptive threshold processes, step 20, FIG. 2. The adaptive thresholding processes of this invention preferably use beam signals output from input array 21, e.g., 30 beam signals output from various sensors of the plurality of sensors 12 of sensor array 10, FIG. 1, as discussed above.

For a given beam signal, at first, all possible weak candidate target signals are located by one or more of adaptive thresholding processes (discussed below) to reduce computation and avoid enlarging false target signals. In principle, the method or system (discussed below) of enhancing weak candidate target signals of this invention could be applied to the entire data samples. However, this would require computing signal waveform correlations for every sample in a range of samples, which would require extensive computational power. As known by those skilled in the art, weak candidate target signals are typically sparse within a given beam signal for a predetermined range of samples. This results in a lot of unnecessary computation is performed. In order to reduce such unnecessary computation, a simple thresholding technique is firstly used to identify most of background return signals. The weak candidate target signals are located using one of the adaptive thresholding processes of this invention. Then, the weak candidate target signals are enhanced.

In order to identify most of background return signals using a simple thresholding process, the maximal value of the beam signal amplitude for a given beam signal is calculated. Then, the threshold value is then set equal to the about 30 to 50 percent of the maximal value. The sample points with value less than the threshold value are treated as background points. Mathematically, this is described as follows:
Let x(r) be a beam signal sample, the thresholding function D(x(r)) is defined by $$D(x(r)) = \begin{cases} 1, & x(r) > \eta \\ 0, & x(r) \le \eta \end{cases} \quad (1)$$

where $$\eta = \alpha * \max\{x(r)\}, \alpha \in (0.3, 0.5) \quad (2)$$

When D(x(r))=0, x(r) is a background point.

In order to determine the location of weak candidate target signals using an adaptive thresholding process, false target signals need to be accepted. However, it is desirable to have a thresholding technique which can locate weak candidate target signals and produce as few as false target signals as possible. The inventor hereof has developed two new adaptive thresholding processes which locate weak candidate target signals within a given beam signal. One process is based on local noise distribution to set threshold values, and the other one is based on higher order statistics of local noise distribution to set threshold values.

In one embodiment, the adaptive thresholding process of this invention may include extracting a histogram of the background noise for each of the weak candidate target signals which approximates the noise distribution around a weak candidate target signal using a local noise window around the weak candidate signal. The histogram is then used to set values for the adaptive thresholding process, e.g., as discussed with reference to equation (3) discussed below.

Figure 3A:
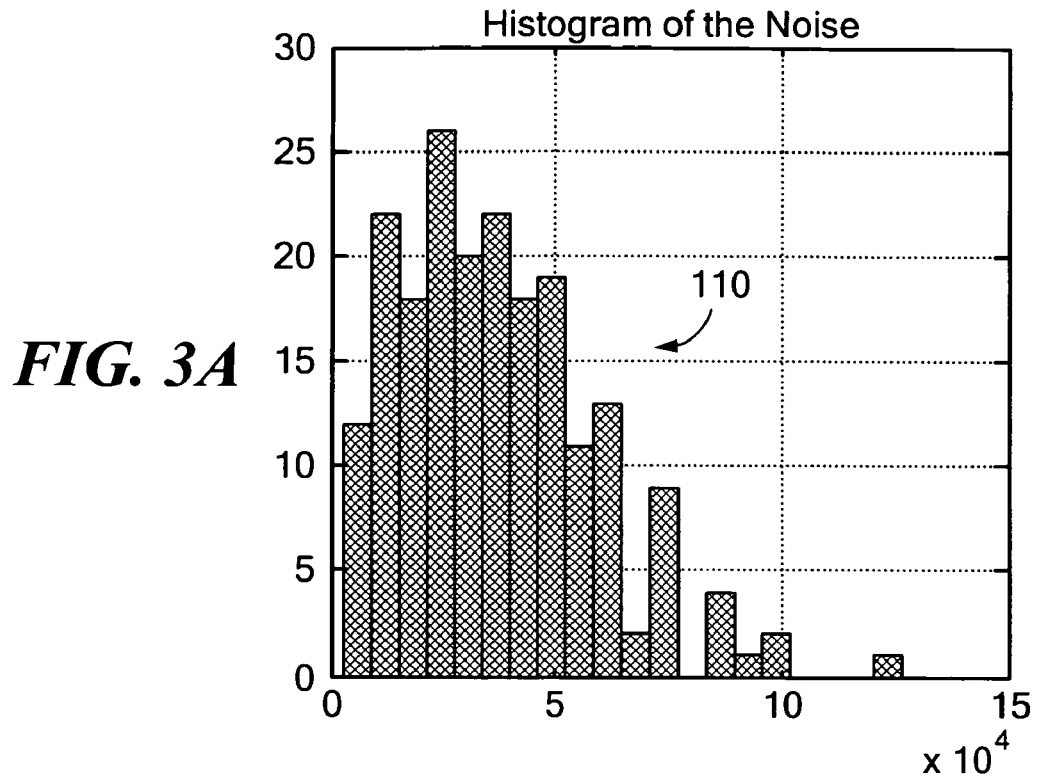
FIG. 3A shows an example of an extracted histogram which approximates the noise distribution around weak candidate target signals using an adaptive thresholding processes of this invention.
Figure 3B:
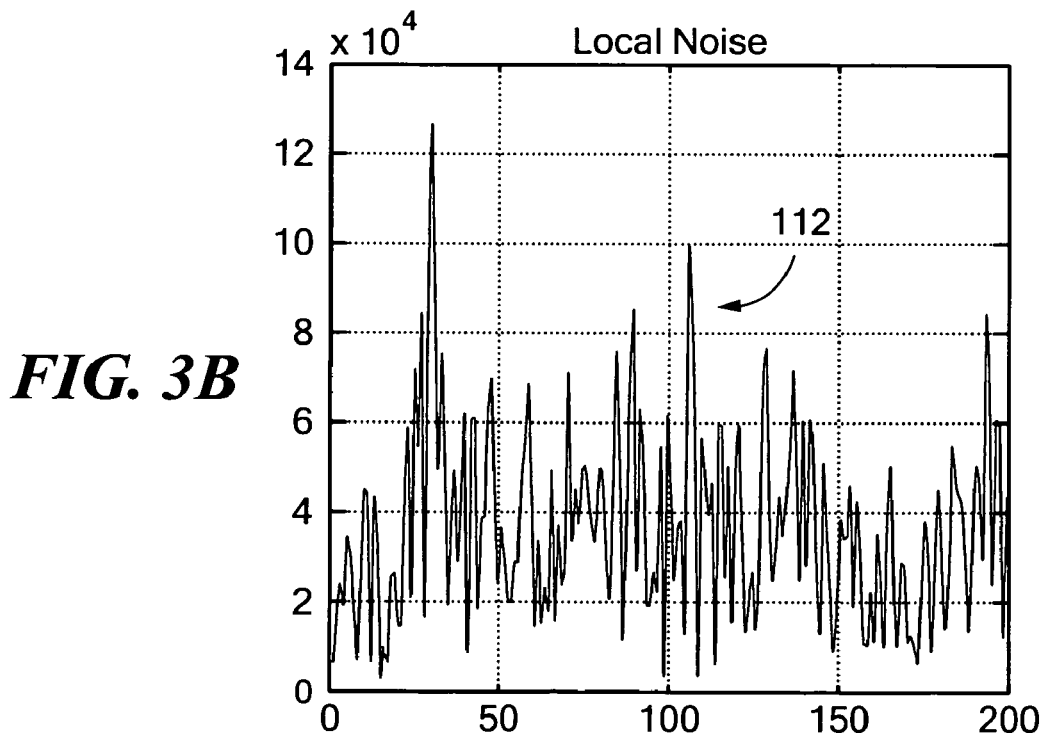
FIG. 3B is a graph showing one example of noise around a weak candidate target signal used to generate the histogram shown in FIG. 3A.
Figure 4:
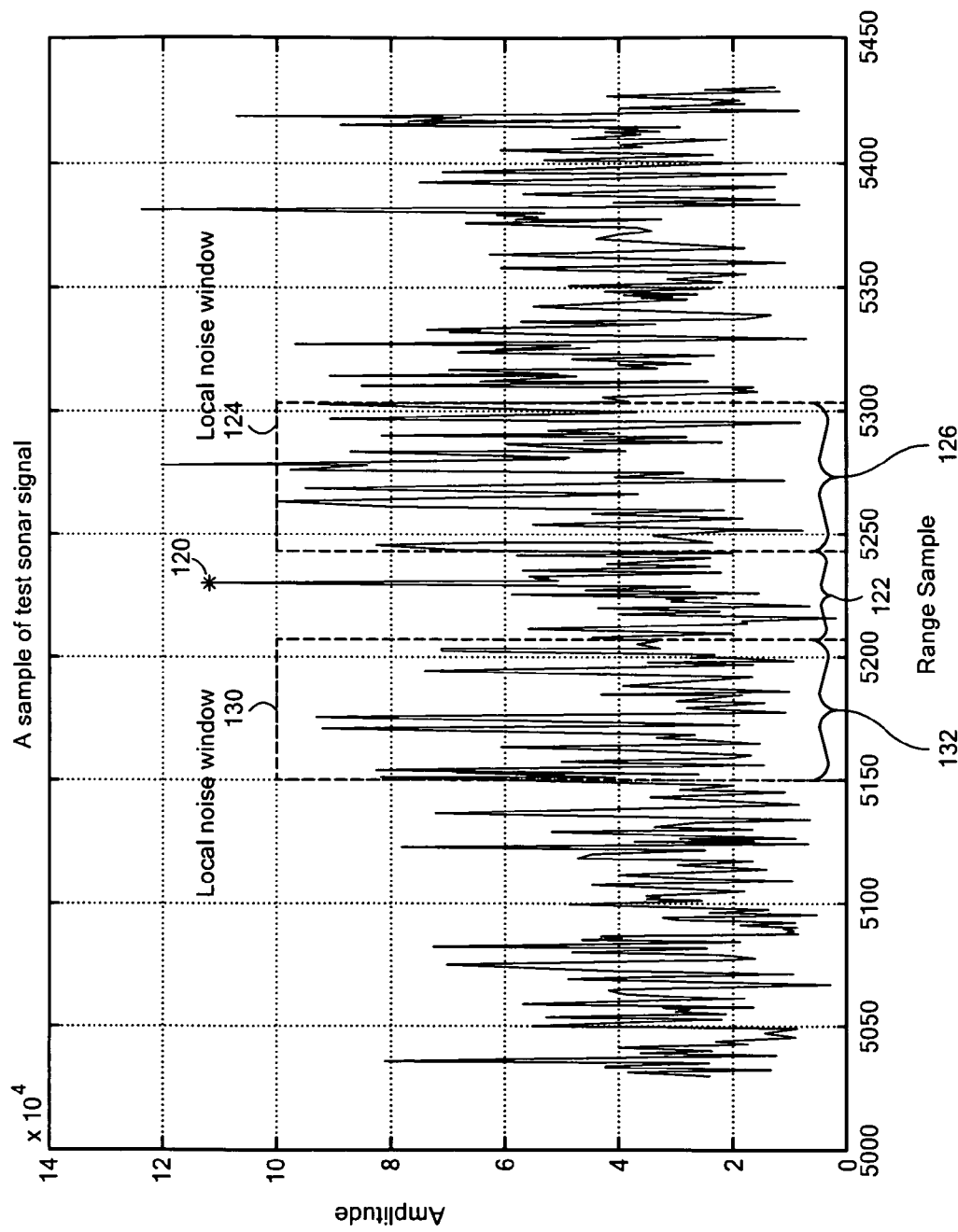
FIG. 4 is a graph showing examples of samples used to detect a weak candidate target signal and showing examples of local noise windows about the weak candidate target signal.

For example, histogram 110, FIG. 3A, of local noise 112, FIG. 3B, is computed or extracted for weak candidate target signal 120, FIG. 4, using local noise window 124 and local noise window 130 around weak candidate target signals 120. A predetermined number of samples is taken of possible weak candidate target signals, e.g. about 10 to 20 samples. In this example, target samples of weak candidate target signal 120 are taken from about sample 5210 to about sample 5230, indicated by local signal profile window 122. In this example, local noise window 124 includes about 60 samples, e.g., from about sample 5240 to about sample 5310, indicated at 126, and local noise window 130 includes about 60 samples, e.g., from about sample 5150 to about sample 5210, indicated at 132. As known by those skilled in the art, any number of samples may be taken for any desired number of weak candidate target signals and the local noise windows may have any number of samples on both sides of the weak candidate target signal.

It is reasonable to assume that within local noise window 124, 130, the noise of weak candidate target signal 120 shares the same distribution. Since noise is densely distributed within a given beam signal, local noise window 124, 130 is used to extract enough local noise data samples to provide an estimation of the noise distribution. Then, the normalized histogram, e.g., histogram 110, FIG. 3A, of the local noise, e.g., local noise 112, FIG. 3B, is computed in order to obtain an estimation of the local noise distribution. Histogram 110 is then used to set threshold values of the adaptive thresholding process, using equation (3).

Mathematically stated: let x(r) be a beam data or beam signal point, and $t_p$ be a point on the noise distribution function that has the probability value of p. That is, if $Pr_n$ is the noise distribution function, $Pr_n(t_\alpha)=\alpha$. Then, the thresholding function is given as follows:

$$D(x(r)) = \begin{cases} 1, & x(r) > t_{\alpha_1} \\ 1, & t_{\alpha_2} \le x(r) \le t_{\alpha_1} \\ 0, & x(r) \le t_{\alpha_2} \end{cases} \quad (3)$$

and $$\eta = \frac{x(r) - \text{loc\_mean}}{\text{loc\_mean}} \ge 2$$

Therefore, when D(x(r))=1, x(r) is a target point, and D(x(r))=0. x(r) is a noise point. Loc_mean denotes the local mean value computed within a local window. The parameter $\alpha_1$ is larger than the parameter $\alpha_2$. One of advantages of this adaptive thresholding technique is that it works for any kind of local noise distributions, both Gaussian noise and non-Gaussian noise.

As discussed in the Background section above, the assumption that noise in the weak candidate target signals is Gaussian distributed is not always true. Due to complex environments, such as a complicated undersea environment, or any similar complicated environment, the noise distribution may be both Gaussian and non-Gaussian distributed. The adaptive thresholding technique discussed above accommodates both Gaussian noise and non-Gaussian noise and is relatively computationally simple. Another adaptive thresholding technique of this invention (discussed below) is computationally more intensive. The performance of each technique depends on its application.

In another embodiment, the adaptive thresholding process of this invention includes using a set of noise samples from a noise window around each of the weak candidate target signals to estimate a higher order statistic of the noise. The higher order static is then used to set threshold values for the adaptive thresholding process, as discussed below with reference to equation (7). This adaptive thresholding process accommodates both Gaussian and non-Gaussian noise distribution.

For Gaussian noise processes, the second order statistics of the noise may be utilized to determine the properties of the noise. However, in order to determine the properties of a non-Gaussian noise process, high order statistics are used. Using the adaptive thresholding process of this embodiment, the local noise sample data is collected using a local noise window, e.g., local noise sample 112, FIG. 3B, is collected using local noise window 124, 130, FIG. 4. High order statistics of local noise distribution is then estimated using the collected noise sample data. Most commonly used high order statistics to represent non-Gaussian distribution include third-order and the fourth-order cumulants because the higher order cumulants of Gaussian processes vanish. In order to accommodate both Gaussian and non-Gaussian noise, this adaptive thresholding process uses the second order cumulant computed from the collected noise samples because it is a statistic which represents both Gaussian and non-Gaussian noise processes. Mathematically, the second order cumulant is defined as follows:

$$C_{2x}(\tau) = E[x(r)x(r+\tau)] \quad (4)$$

where x(r) is the collected noise samples. Most non-Gaussian noise distributions are non-symmetric and with a heavy tail. In fact the size of the tail of non-Gaussian noise distributions plays an important role in computing threshold values. In high order statistics, Kurtosis, one of high order statistics, characterizes the size of the tail of a distribution. Kurtosis is mathematically calculated using equation (5) below:

$$K = \frac{E[(x(r) - \mu_x)^4]}{\sigma_x^4} \quad (5)$$

where $\mu_x$ and $\sigma_x$ are the mean and standard deviation of x(r). In general, a flat distribution with short tail has a negative Kurtosis value while a peak distribution with a long tail has a positive Kurtosis value. The value of Kurtosis of a Gaussian distribution is about 3. With the two statistics, which include the second order cumulant and Kurtosis, the adaptive thresholding technique function D(x(r)) is defined as follows:

$$D(x(r)) = \begin{cases} 1, & x(r) \geq \eta \\ 0, & x(r) < \eta \end{cases} \quad (6)$$

where the threshold level is given by $$\eta = Xmean + \beta * \alpha \quad (7)$$

and $$Xmean = \text{mean}[x(r), r_1 \leq r \leq r_2] \quad (8)$$

$$\beta = \frac{K}{3.0} + 1.0, \quad (9)$$

$$\alpha = \sqrt{C_{2x}}$$

Equation (8) above describes a local mean value computed within a local noise window defined by range $r_1$ and $r_2$, where $r_1$ is the beginning of the sample range, and $r_2$ is the end of the sample range. From Equation (7) above, it can be seen the threshold value depends on local mean value and a scaled variance. The scale factor is β. When the distribution has a long tail, β has a large value while the distribution has short tail β takes a small value. When the distribution is Gaussian β equals to about 2. Thus, the adaptive thresholding technique of this embodiment of the invention is effective under both Gaussian and non-Gaussian noise environments and the threshold value changes automatically with the tail size of local noise distributions.

The method for enhancing weak target signals for a sensor array of this invention also includes extracting wave profiles of a center beam signal of a weak candidate target signal and adjacent beam signals of the weak candidate target signal using a local signal profile window, step 22, FIG. 2.

Figure 5:
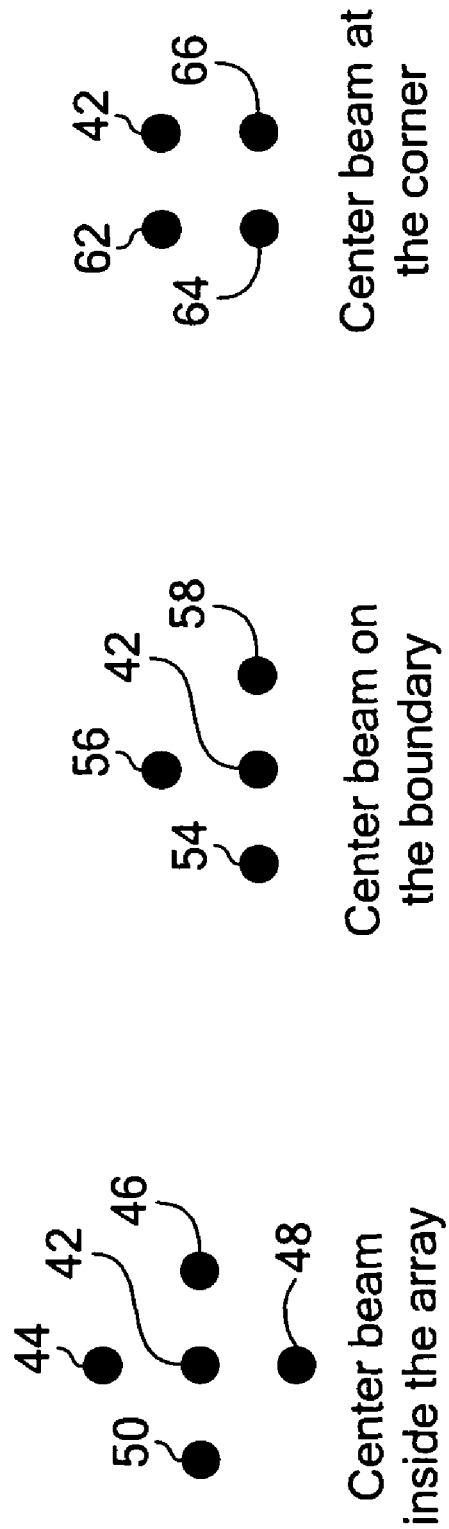
FIG. 5A is a schematic top view showing one orientation of a center beam signal and adjacent beam signals located in the sensory array shown in FIG. 1.
FIG. 5B is a schematic top view showing another orientation of a center beam signal and adjacent beam signals located on the boundary of the sensor array shown in FIG. 1.
FIG. 5C is a schematic top view showing yet another orientation of a center beam signal and adjacent beam signals located on the corner of the sensor array shown in FIG. 1.

For a given beam data, after all possible weak candidate target signals are located within the beam signal data using one or more of the adaptive thresholding processes discussed above, a local signal profile window is used to extract signal waveform for each possible target signal. The local signal profile typically includes about 10 to 20 samples, e.g., local signal profile window 122, FIG. 4, includes samples from about sample 5210 to about sample 5230. A waveform similarity measure is used to compute the correlations between the weak candidate target signal and the corresponding signals in the adjacent signals. For a given beam signal data, the adjacent beam signals are taken from four connected neighbor signals in the array of beam signals. In a rectangular beam array, if the given beam signal is defined as the center beam there are at least three examples to show how adjacent beam signals are selected in relation to the center beam signal. In one example, center beam signal 42, FIG. 5A, is surrounded by adjacent beam signals 44, 46, 48, and 50. In this example, center beam signal 42 and adjacent beam signals 44-50 are located inside the beam array, e.g., as shown in array 10, FIG. 1. In another example, center beam signal 42, FIG. 5B, is surrounded by adjacent beam signals 54, 56, and 58, which are located on the boundary array, e.g., as shown in array 10, FIG. 1. In yet another example, center beam signal 42, FIG. 5C, is surrounded by adjacent beam signals 62, 64, and 66 which is located at the corner of the beam array, e.g., as shown in array 10, FIG. 1.

Figure 6:
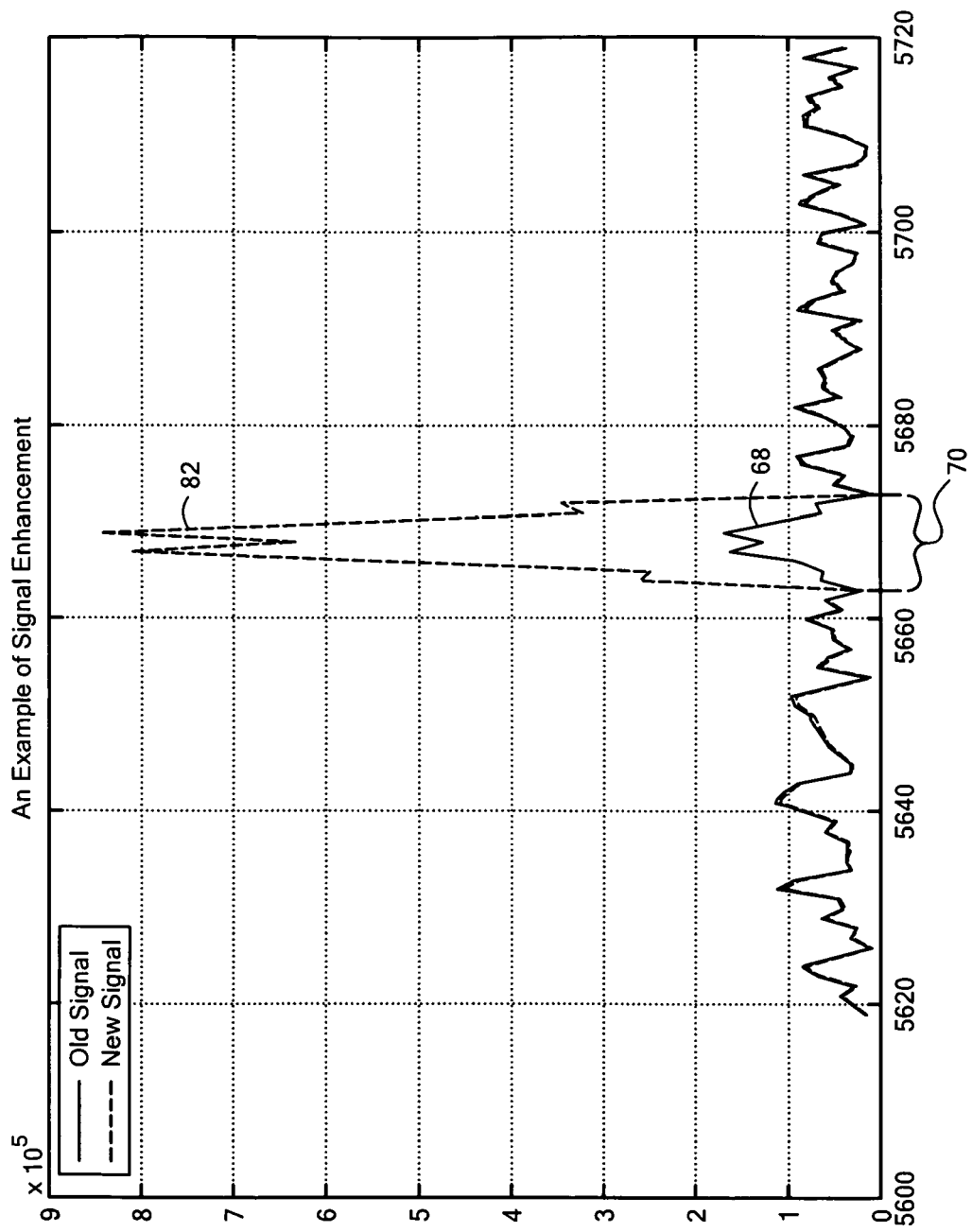
FIG. 6 is a graph showing a waveform plot of one example of a weak target signal waveform before and after enhancement in accordance with this invention.
Figure 7:
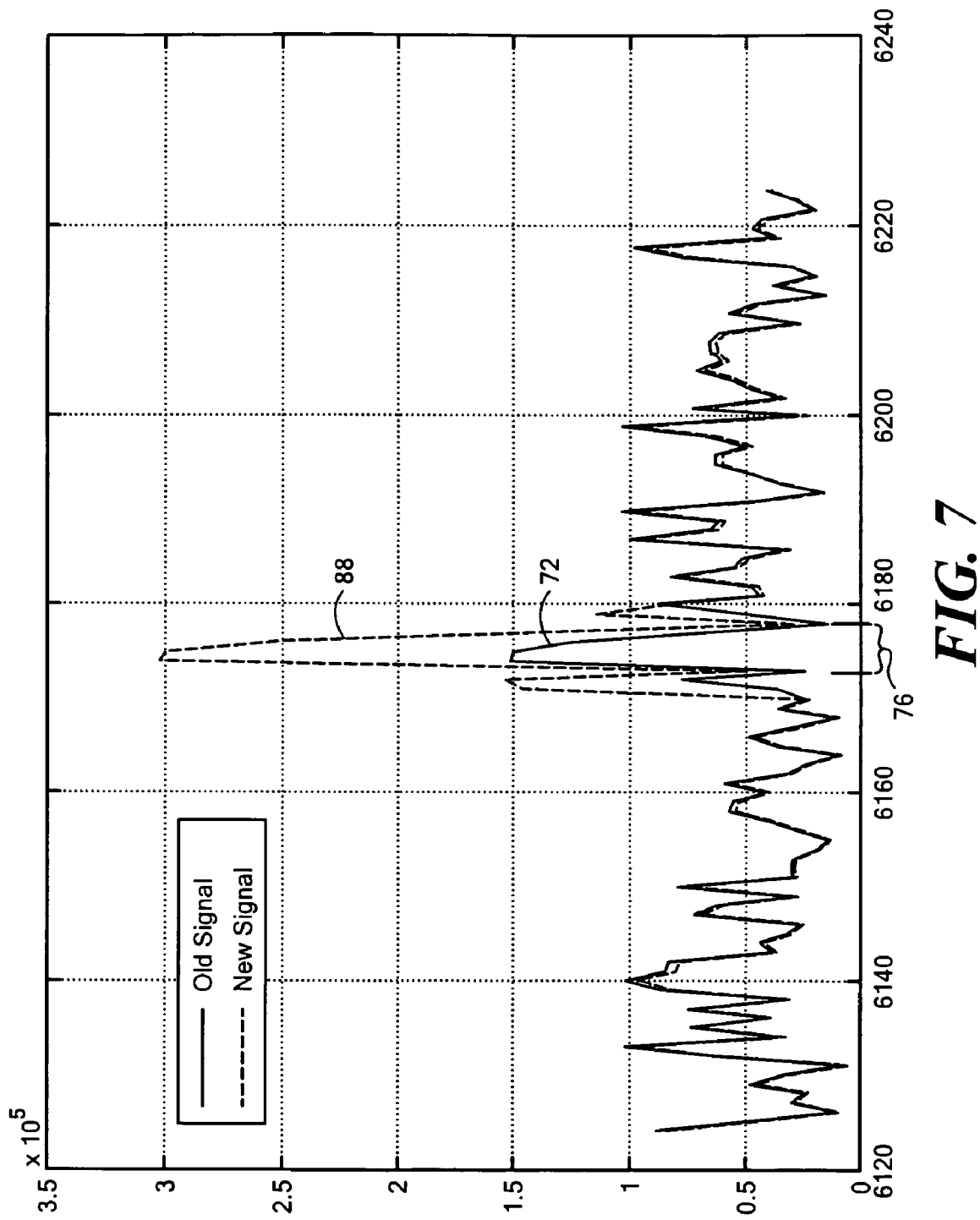
FIG. 7 is a graph showing a waveform plot of another example of a weak target signal waveform before and after enhancement in accordance with this invention.

FIG. 6 shows one example of extracted wave profile 68 of a weak candidate target signal which is part of a center beam signal taken for local signal profile window 70. The wave profiles of the adjacent signals are taken from the adjacent beam data arranged as any of FIGS. 5A-5C at the same range of the samples as the center beam signal. In this example, local signal profile window 70, FIG. 6, is taken between about samples 5660 and 5670. FIG. 7 shows another example of extracted wave profile 72 of a center beam signal and adjacent beam signals for local signal profile window 76. In this example, local signal profile window 76 is between about sample 6170 and 6178. As known by those skilled in the art, the extracted wave profile and local signal profile window may be taken at any predetermined range of samples.

The method for enhancing weak target signals for a sensor array of this invention further includes the step of: determining cross-beam correlations between the extracted wave profile of the center beam signal and extracted wave profiles of adjacent beam signals and correlations between extracted wave profiles of adjacent beam signal profiles based on a similarity of the wave profiles to determine the occurrence of a weak candidate target signal and compute a set of weighting factors computed, step 24, FIG. 2. In this step, the waveform profile similarity measure is used to compute the cross-beam correlations between the weak candidate target signal, center beam signal, and adjacent beam signals. For a given beam signal data, the adjacent beam signals are typically taken from four connected neighboring beam signals in the beam array, e.g., as discussed above in reference to FIG. 1 and FIGS. 5A-5C. To determine the corresponding candidate target signals in the adjacent beam signals, two signal waveform similarities are computed. First, the similarity between center beam signal and adjacent beam signals is computed using equation (10) below:

$$S_{xa}^i(x(r), a_i(r)) = \frac{<x(r), a_i(r)>}{\sqrt{<x(r), x(r)>} \sqrt{<a_i(r), a_i(r)>}} \quad (10)$$

where x(r) represents the raw center beam signal and $a_i(r)$ represents the raw adjacent beam signals.

Next, the similarity between two adjacent beam signals is computed using equation (11):

$$S_{aa}^{ij}(a_i(r), a_j(r)) = \frac{<a_i(r), a_j(r)>}{\sqrt{<a_j(r), a_j(r)>}\sqrt{<a_i(r), a_i(r)>}} \quad (11)$$

where the symbol $<a,b>$ denotes the inner product of a and b and $a_i(r)$ and $a_j(r)$ represents the raw adjacent beam signals.

The method of enhancing weak target signals for a sensor array of this invention further includes enhancing the center beam signal of the weak candidate target signal based on the previously determined correlations and the computed set of weighting factors to provide an enhanced weak candidate target signal, step 26, FIG. 2. Steps 22-26 are then repeated for each of the weak candidate target signals located by the one or more adaptive thresholding processes, as shown by 27, to provide enhanced weak candidate target signals.

The two similarities defined in equations (10) and (11) above are used as the signal correlation measures to determine the corresponding target signals in the adjacent beam signals. The correlations are first used to compute a set of weighting factors. Then, the enhanced weak target signal is computed using the corresponding target signals and the weighting factors. To compute the enhanced target signal with the signal correlations, two different processes of the method of this invention may be utilized. One process is known as a winner-takes-all process and the other process is known as the weighted-average process.

For each process, mathematically stated: let $x(r)$ represent the weak candidate target signal of the center beam signal, and $\hat{x}(r)$ represent enhanced weak candidate target signal. Using the correlations computed from equation (10) and (11) above: $S_{xa}^i$, $i=1,2,3 \ldots K$ and $S_{aa}^{ij}$, $i=1,2,3 \ldots, K$; $j=1,2,3 \ldots, K$; $i \neq j$. K is the number of the adjacent beam signal.

In one embodiment, the winner-take-all process includes determining the adjacent beam signal having the highest cross-beam correlation between the center beam signal and the adjacent beam signals and having the highest amplitude and replacing the center beam signal with that adjacent beam signal to provide the enhanced weak candidate target signal. In this embodiment, in order to compute the weighting factor $w_x$ for the center beam signal, an index set is defined as:

$$I = \{i : i=1,2, \ldots, K; S_{xa}^i \geq \alpha; \alpha \in [0.8, 0.95]\} \quad (12)$$

Then, $$w_x = 1.0 + |I|. \quad (13)$$

where the symbol |I| denotes the cardinality of the set I.

To compute the weighting factor, $w_i$, for the adjacent signals, the peak values of the adjacent signals is computed. To do this, let $Pk_x = \max[x(r)]$ and $Pk_i = \max[a_i(r)]$, $i=1,2,\ldots,K$.

Next, the high correlation sets are computed as defined by $$u_j = \{i : i=1,2, \ldots, K; S_{aa}^{ij} \geq \alpha; Pk_x \leq Pk_j\} \quad (14)$$

The maximal number of high correlation values is then calculated using:

$$n_j = |u_j|; j=1,2, \ldots K_l; K_l \leq K \quad (15)$$

and $$n_l = \max\{n_j; j=1,2, \ldots, K_l\} \quad (16)$$

Then, the weighting factor is set by $$w_i = 1.0 + n_l. \quad (17)$$

The enhanced signal $\hat{x}(r)$ is calculated using the winner-take-all process as follows:

If $w_x > 1.0$ \quad (18)
$\hat{x}(r) = w_x * x(r)$
else if $w_i > 1.0$
$\hat{x}(r) = w_i * a_i(r)$ \quad (19)
else
$\hat{x}(r) = x(r);$ \quad (20)

Using the winner-take-all process discussed above, the enhanced signal is computed from only one signal that has the greater number of high correlation values with the adjacent signals. The number of high correlation values is used as the weighting factor.

In another embodiment, the weighted-average process includes determining a weighted sum of the center beam signal and adjacent beam signals based on the previously determined cross-beam correlations and replacing the center beam signal with a signal representing the weighted sum to provide the enhanced weak candidate target signal.

Using the weighted-average process of this invention, the enhanced weak candidate target signal, $\hat{x}(r)$, is calculated by the weighted sum of the center target signal $x(r)$ and the adjacent signals $a_i(r)$, $i=1,2,\ldots,K$. To compute the weighting factors for each signal, the similarity measure $S_{xa}^i$ and $S_{aa}^{ij}$ defined by equations (10) and (11) above is first computed. Then, two averaged similarity measures are computed, where $\overline{S}_{xa}$ = the average of the first two largest $S_{xa}^i$, and $\overline{S}_{aa}$ = the average of the first three largest $S_{aa}^{ij}$.

To compute the weighting factors using the weighted-average process: 1) when $\overline{S}_{xa} \leq \overline{S}_{aa}$, the weighting factor, $w_x$, is set equal to about 0.2 for the center beam signal $x(r)$. Then a set of coefficients is computed using equation (21) below:

$$q_a^i = \frac{S_a^i}{\sum_k S_a^k}, \quad (21)$$

and $$S_a^i = \frac{1}{K} \sum_j S_{aa}^{ij} \text{ for } i = 1, 2, \ldots, K.$$

Where K is the number of adjacent beam signals involved in computing the first three largest $S_{aa}^{ij}$. The weighting factors for the adjacent signals are given by:

$$w_i = 0.8 * q_a^i \quad (22)$$

2) when $\overline{S}_{xa} \leq \overline{S}_{aa}$, the weighting factor, $w_x$, is set equal to about 0.6. Then, the set of coefficients is computed using equation (23) below:

$$q_a^i = \frac{S_{xa}^i}{\sum_k S_{xa}^k}; \quad (23)$$

$$i = 1, 2, \ldots, K$$

The weighting factors, $w_i$, $i=1,2,\ldots,K$, are computed using equation (24):

$$w_i = 0.4 * q_a^i \quad (24)$$

Using the computed weighting factors, the enhanced signal $\hat{x}(r)$ is computed using the weighted-average process as follows:

$$\hat{x}(r) = w_x * x(r) + \sum_i w_i * a_i(r) \qquad (25)$$

In the weighed-average process, the enhanced signal is calculated from all adjacent beam signals and the center beam signal. Every corresponding signal in the adjacent beam signals has a contribution to the enhanced center beam signal. In this example, $\hat{x}(r)$ in equation (25) above represents the enhanced weak target signal (center beam signal), and $a_i(r)$ represents the adjacent beam signals.

Figure 8:
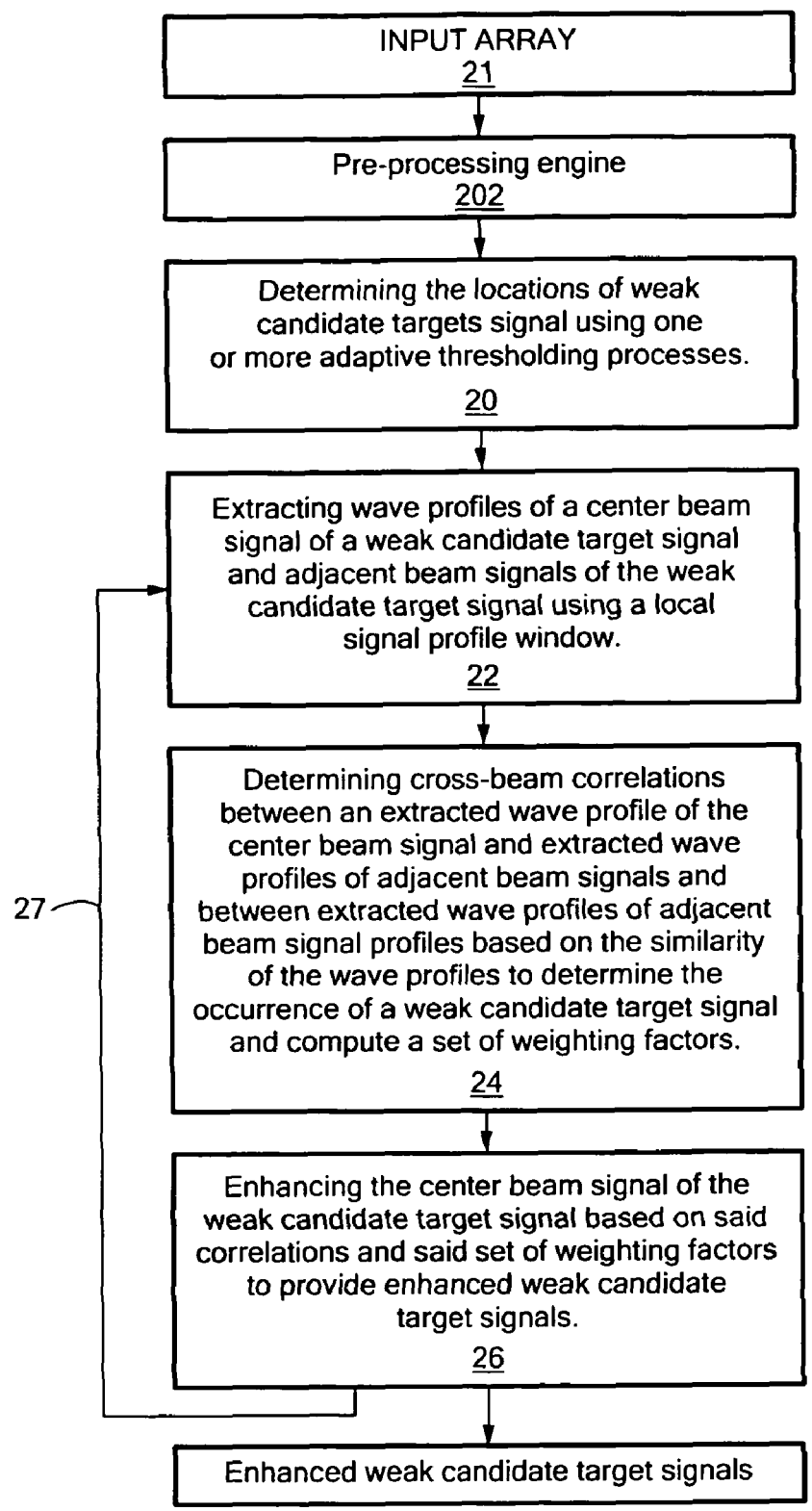
FIG. 8 is a schematic block diagram showing the primary components associated with one embodiment of the system for enhancing weak target signals for a sensor array of this invention.

System 200, FIG. 8, for enhancing weak target signals for a sensor array, e.g., sensor array 10, as discussed above in reference to FIG. 1 of this invention, includes pre-processing engine 20, FIG. 8, responsive to buffer data from input array 21 configured to perform steps 20, 22, 24, and 26 as discussed in detail above with reference to FIGS. 1-7.

Figure 9:
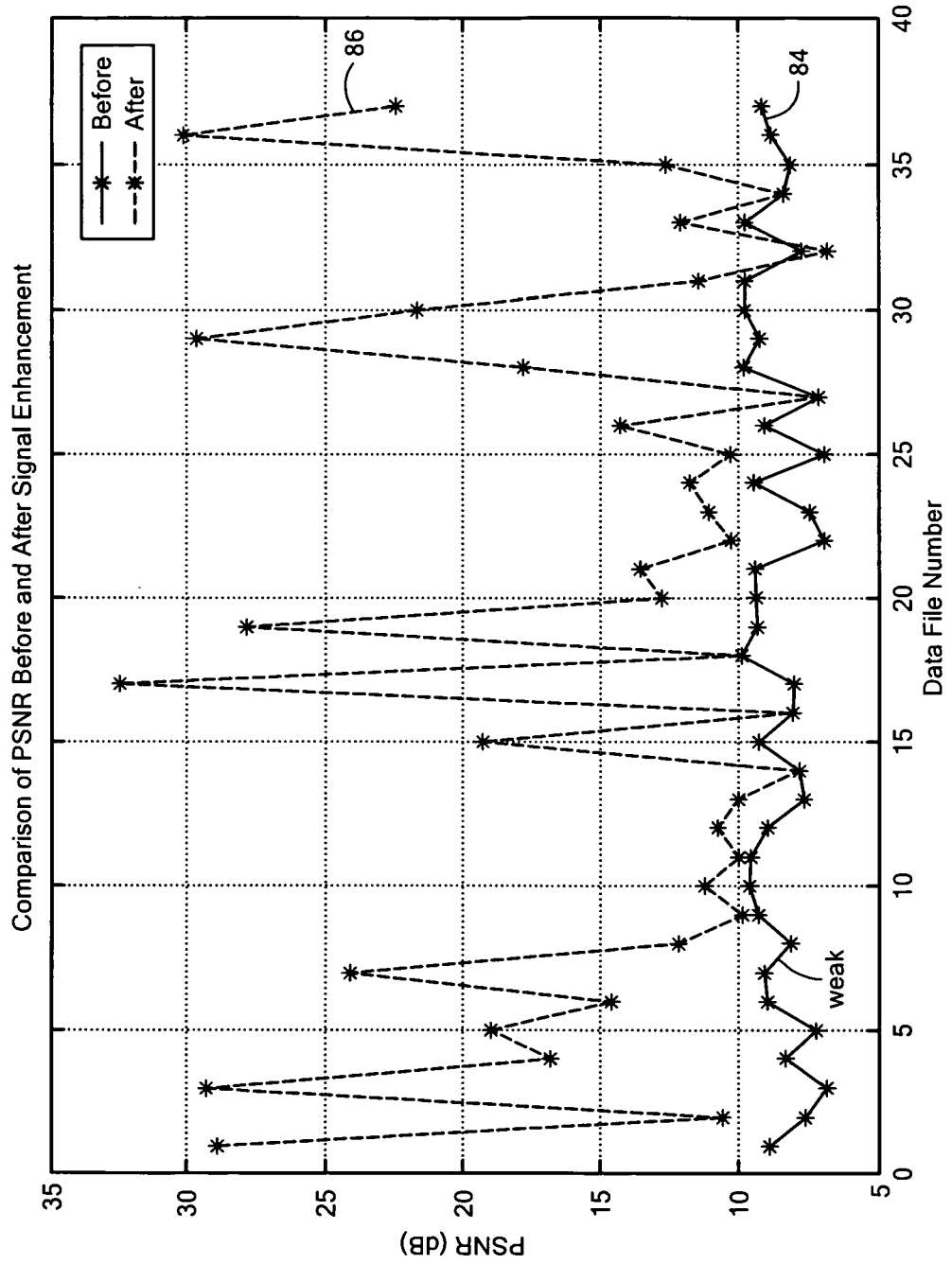
FIG. 9 is a graph showing plots of the peak signal-to-noise ratio (PSNR) of a number of weak target signals before and after enhancement using the winner-take-all weighting process of the method of this invention.
Figure 10:
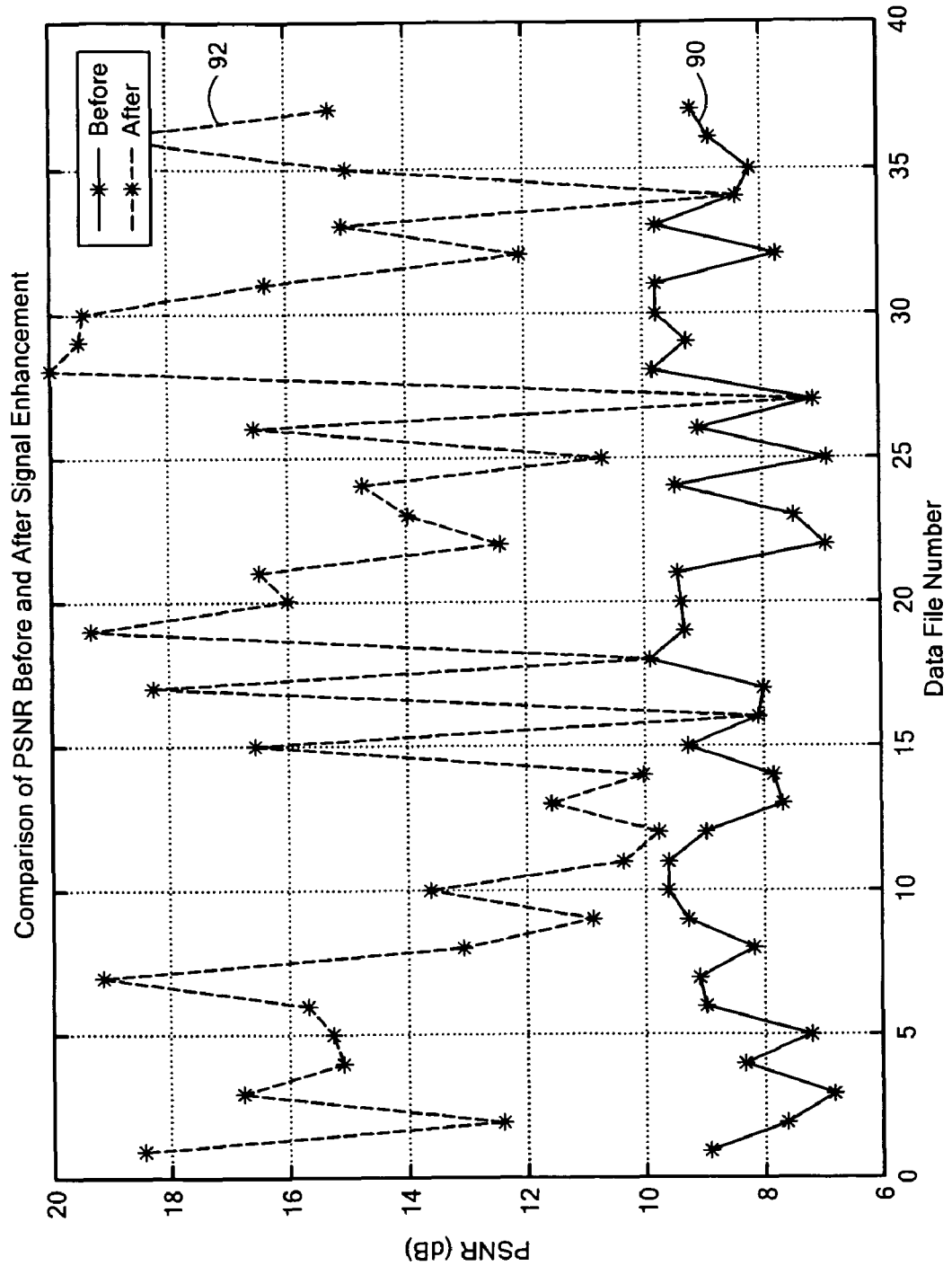
FIG. 10 is a graph showing plots of the PSNR of a number of weak target signals before and after enhancement using the weighted-average process of method of this invention.

The result of both the winner-take-all process and the weighted-average process of the method of enhancing weak candidate target signals of the invention is that weak candidate target signals are effectively and efficiently enhanced. Thus, the system and method for enhancing weak target signals of this invention improves accuracy and reduces false target signals. FIGS. 6 and 7 show examples of weak candidate target signal which have been enhanced in accordance with system and method for enhancing weak target signals of this invention. In one example, a weak candidate target signal before enhancement is shown by wave profile 68, FIG. 6, and the enhanced weak candidate target signal generated in accordance with this invention is shown by wave profile 82. In another example, a weak candidate target signal is shown by wave profile 72, FIG. 7, and the enhanced weak candidate target signal generated in accordance with this invention is shown by wave profile 88. FIG. 9 shows the improvement of the PSNR of 37 weak candidate target signals which have been enhanced using the winner-take-all process of the system and method of this invention. In this example, plot 84 shows the PSNR of weak candidate target signals before enhancement and plot 86 show the PSNR of weak candidate target signals after enhancement. As shown in FIG. 9, each point on plot 84 represents a PSNR value for a weak target signal before enhancement and each point on plot 86 represents a PSNR value for a weak target signal after enhancement. FIG. 10, in a similar manner, shows the improvement of PSNR 37 weak candidate target signals using weighted-average process of this invention. In this example, the PSNR of weak candidate target signals before enhancement are shown by plot 90 and the PSNR of enhanced weak candidate target signals after enhancement are shown by plot 92. Each point of plot 90 represents a PSNR value for a weak target signal before enhancement and each point on plot 92 represents a PSNR value for a weak candidate target signal after enhancement.

In one trial test in accordance with this invention, forward-looking sonar data was collected. In this example, the data contained 249 ping data with 290 labeled target signal locations. To evaluate the adaptive thresholding process of this invention, the adaptive thresholding process was compared to a conventional standard thresholding technique widely used in sonar signal detection. In this test, the threshold level for the standard thresholding technique was determined by:

$$\eta = \text{mean} + \beta * \sigma_n, \quad \beta \in [2, 5] \qquad (26)$$

where the $\sigma_n$ is the standard deviation of the noise. The purpose of the test was to determine which thresholding technique produces less false targets. In this test, the local window size for computing noise distribution was 50 range samples and the target signal width was 5 range samples. In equation (3) above, the value of $\alpha_1$ was about 0.95 and the value of $\alpha_2$ was about 0.93. The detection was only performed within the local window. The test result is summarized in Table 1 below:

TABLE 1

Comparison of Thresholding Techniques

| Method | True Target Number | Detected Target Number | False Target Number |
|---|---|---|---|
| Gaussian Method | 290 | 284 | 2338 |
| Histogram Method | 290 | 284 | 997 |
| High Order Statistics Method | 290 | 283 | 893 |

From Table 1 it can be seen that the adaptive thresholding process of this invention is much better than the conventional standard thresholding technique at reducing false target signals.

To evaluate the capability of enhancement of weak candidate target signals using the system and/or method for enhancing weak target signals of this invention, a peak signal to noise ratio (PSNR) was computed to select weak candidate target signals from the real data. The peak signal to noise ratio is defined by:

$$PSNR = 10 * \log_{10}\left(\frac{A^2}{\sigma_n^2}\right) \qquad (27)$$

where A is the peak value of signal $x(r)$ and $\sigma_n^2$ is the variance of background noise within a local range window. In this example, the local range window was 50 range samples and signal width was 5 range samples. Weak candidate target signals were defined as the signals with PSNR less than 10 dB. Totally, 37 weak target signals were obtained from the 290 labeled test signals. The winner-take-all process and the weighted-average process of the system and method of this invention were tested. The results are shown in FIGS. 9 and 10, respectively, discussed above. For the winner-takes-all process, before the signal enhancement, the averaged PSNR of all 37 weak target signals was about 8.61 dB. After the signal enhancement in accordance with this invention, the averaged PSNR was about 15.59 dB. This results in about a 6.98 dB increase in averaged PSNR. For the weighted-average process, before the signal enhancement, the averaged PSNR was about 8.61 dB. After signal enhancement, the averaged PSNR was about 14.38 dB. The result is about a 5.77 dB increase in averaged PSNR. FIGS. 6 and 7, discussed above, shown examples of waveform plots which show signal waveform before and after the signal enhancement of the winner-take-all and weighted-average processes, respectively. The experimental, results confirm that the system and method of enhancing weak target signals of this invention is very effective at enhancing weak candidate target signals.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A method for enhancing weak target signals for a sensor array, the method comprising:
 a) determining the locations of weak candidate target signals using one or more adaptive thresholding processes;
 b) extracting a wave profile of a center beam signal of a weak candidate target signal and adjacent beam signals of the weak candidate target signal using a local signal profile window;
 c) determining cross-beam correlations between an extracted wave profile of the center beam signal and extracted wave profiles of the adjacent beam signals and between extracted wave profiles of adjacent beam signal profiles based on the similarity of the wave profiles to determine the occurrence of a weak candidate target signal and compute a set of weighting factors;
 d) enhancing the center beam signal of the weak candidate target signal based on the said correlations and said set of weighting factors; and
 e) repeating steps b) through d) for each of the weak candidate target signals to provide enhanced weak candidate target signals, wherein all of the above steps are performed with a pre-processing engine comprising a computer program embodied on a non-transitory computer readable medium.

2. The method of claim 1 in which the one or more adaptive thresholding processes includes an adaptive thresholding process which extracts a histogram for each of the weak candidate target signals which approximates the noise distribution around a weak candidate weak target signal using at last one local noise window and uses that histogram to set threshold values for the adaptive thresholding process.

3. The method of claim 2 in which the one or more adaptive thresholding processes accommodates Gaussian noise and non-Gaussian noise.

4. The method of claim 1 in which the one or more adaptive thresholding processes includes an adaptive thresholding process which utilizes a set of noise samples from a noise window around each of the weak candidate target signals to estimate a high order statistic of the noise samples and uses that estimate to set threshold values for the adaptive thresholding process.

5. The method of claim 4 in which the high order static includes Kurtosis static.

6. The method of claim 4 in which the one or more adaptive thresholding processes accommodates Gaussian noise and non-Gaussian noise.

7. The method of claim 1 further including a winner-take-all weighting process which includes determining the adjacent beam signal having the highest cross-beam correlation between the center beam signal and the adjacent beam signals and having the highest amplitude and replacing the center beam signal with that adjacent beam signal to provide an enhanced weak candidate target signal.

8. The method of claim 1 further including a weighted-average weighting process which includes determining a weighted sum of the center beam signal and the adjacent beam signals based on previously determined said cross-beam correlations and replacing the center beam signal with a signal representing the weighted sum to provide an enhanced weak candidate target signal.

9. The method of claim 1 in which the sensor array includes a forward-looking sonar array.

10. A method for enhancing weak target signals for a sensor array, the method comprising:
 a) determining the locations of weak candidate target signals using one or more adaptive thresholding processes which includes an adaptive threshold process which extracts a histogram of the weak candidate target signal which approximates the noise distribution around the weak candidate weak target signal using a local noise window and which uses that histogram to set threshold values for the adaptive thresholding process;
 b) extracting a wave profile of a center beam signal of a weak candidate target signal and adjacent beam signals of the weak candidate target signal using a local signal profile window;
 c) determining cross-beam correlations between an extracted wave profile of the center beam signal and extracted wave profiles of the adjacent beam signals and determining correlations between extracted wave profiles of adjacent beam signal profiles based on the similarity of the wave profiles to determine the occurrence of a weak target signal in the adjacent beam signals to compute a set of weighting factors;
 d) enhancing the center beam signal of the weak target signal based on the said correlations and said set of weighting factors; and
 e) repeating steps b) through d) for each of the weak candidate target signals to provide enhanced weak target signals, wherein all of the above steps are performed with a pre-processing engine comprising a computer embodied on a non-transitory computer readable medium.

11. The method of claim 10 in which the one or more adaptive thresholding processes accommodates Gaussian noise and non-Gaussian noise.

12. The method of claim 10 in which the one or more adaptive thresholding processes includes an adaptive thresholding process which utilizes a set of noise samples from a noise window around each of the weak candidate target signals to estimate a high order statistic of the noise samples and which uses that estimate to set threshold values for the adaptive thresholding process.

13. The method of claim 12 in which the high order static includes Kurtosis static.

14. The method of claim 12 in which the one or more adaptive thresholding processes accommodates Gaussian noise and non-Gaussian noise.

15. The method of claim 10 further including a winner-take-all weighting process which includes determining the adjacent beam signal having the highest cross-beam correlation between the center beam signal and the adjacent beam signals and having the highest amplitude and replacing the center beam signal with that adjacent beam signal to provide an enhanced weak candidate target signal.

16. The method of claim 10 further including a weighted-average weighting process which includes determining a weighted sum of the center beam signal and the adjacent beam signals based on previously determined said cross-beam correlations and replacing the center beam signal with a signal representing the weighted sum to provide an enhanced weak candidate target signal.

17. The method of claim 10 in which the sensor array includes a forward-looking sonar array.

18. A method for enhancing weak target signals for a sensor array, the method comprising:
   a) determining the locations of weak candidate target signals using one or more adaptive thresholding processes which includes an adaptive thresholding process which uses a set of noise samples from a noise window around the weak candidate target signal to estimate a high order statistic of the noise samples and which uses the estimate to set threshold values for the adaptive thresholding process;
   b) extracting a wave profile of a center beam signal of a weak candidate target signal and adjacent beam signals of the weak candidate target signal using a local signal profile window;
   c) determining cross-beam correlations between an extracted wave profile of the center beam signal and extracted wave profiles of the adjacent beam signals and determining correlations between extracted wave profiles of adjacent beam signal profiles based on the similarity of the wave profiles to determine the occurrence of a weak target signal in the adjacent beam signals to compute a set of weighting factors;
   d) enhancing the center beam signal of the weak target signal using said correlations and said set of weighting factors; and
   e) repeating steps b) through d) for each of the weak candidate target signals to provide enhanced weak target signals wherein all of the above steps are performed with a pre-processing engine comprising a computer program embodied on a non-transitory computer readable medium.

19. The method of claim 18 in which the one or more adaptive thresholding processes includes an adaptive thresholding process which extracts a histogram for each of the weak candidate target signals which approximates the noise distribution around a weak candidate weak target signal using at last one local noise window and uses that histogram to set threshold values for the adaptive thresholding process.

20. The method of claim 19 in which the one or more adaptive thresholding processes accommodates Gaussian noise and non-Gaussian noise.

21. The method of claim 18 in which the high order static includes Kurtosis static.

22. The method of claim 18 in which the one or more adaptive thresholding processes accommodates Gaussian noise and non-Gaussian noise.

23. The method of claim 18 further including a winner-take-all weighting process which includes determining the adjacent beam signal having the highest cross-beam correlation between the center beam signal and the adjacent beam signals and having the highest amplitude and replacing the center beam signal with that adjacent beam signal to provide an enhanced weak candidate target signal.

24. The method of claim 18 further including a weighted-average weighting process which includes determining a weighted sum of the center beam signal and the adjacent beam signals based on previously determined said cross-beam correlations and replacing the center beam signal with a signal representing the weighted sum to provide an enhanced weak candidate target signal.

25. The method of claim 18 in which the sensor array includes a forward-looking sonar array.

26. A system for enhancing weak target signals for a sensor array comprising:
   a pre-processing engine comprising a computer program embodied on a non-transitory computer readable medium, the pre-processing engine responsive to buffer data from a sensor array and configured to:
      a) determine the locations of weak candidate target signals using one or more adaptive thresholding processes;
      b) extract a wave profile of a center beam signal of a weak candidate target signal and adjacent beam signals of the weak candidate target signal using a local signal profile window;
      c) determine cross-beam correlations between an extracted wave profile of the center beam signal and extracted wave profiles of the adjacent beam signals and between extracted wave profiles of adjacent beam signal profiles based on the similarity of the wave profiles to determine the occurrence of a weak candidate target signal and compute a set of weighting factors;
      d) enhance the center beam signal of the weak candidate target signal based on the said correlations and said set of weighting factors; and
      e) repeat steps b) through d) for each of the weak candidate target signals to provide enhanced weak candidate target signals.

27. The system of claim 26 in which the one or more adaptive thresholding processes includes an adaptive thresholding process which extracts a histogram for each of the weak candidate target signals which approximates the noise distribution around a weak candidate weak target signal using at last one local noise window and which uses that histogram to set threshold values for the adaptive thresholding process.

28. The system of claim 26 in which the one or more adaptive thresholding processes accommodates Gaussian noise and non-Gaussian noise.

29. The system of claim 26 in which the one or more adaptive thresholding processes includes an adaptive thresholding process which utilizes a set of noise samples from a noise window around each of the weak candidate target signals to estimate a high order statistic of the noise samples and uses that estimate to set threshold values for the adaptive thresholding process.

30. The system of claim 29 in which the high order static includes Kurtosis static.

31. The system of claim 29 in which the one or more adaptive thresholding processes accommodates Gaussian noise and non-Gaussian noise.

32. The system of claim 26 further including a winner-take-all weighting process which includes determining the adjacent beam signal having the highest cross-beam correlation between the center beam signal and the adjacent beam signals and having the highest amplitude and replacing the center beam signal with that adjacent beam signal to provide an enhanced weak candidate target signal.

33. The system of claim 26 further including a weighted-average weighting process which includes determining a weighted sum of the center beam signal and the adjacent beam signals based on previously determined said cross-beam correlations and replacing the center beam signal with a signal representing the weighted sum to provide an enhanced weak candidate target signal.

34. The system of claim 26 in which the sensor array includes a forward-looking sonar array.

35. The system of claim 26 in which said pre-processing engine comprises a computer program embodied on a non-transitory computer readable storage medium.

36. A system for enhancing weak target signals for a sensor array comprising:
- a pre-processing engine comprising a computer program embodied on a non-transitory computer readable storage medium, the pre-processing engine responsive to buffer data from a sensor array and configured to:
  - a) determine the locations of weak candidate target signals using one or more adaptive thresholding processes which includes and adaptive thresholding process which extracts a histogram of the weak candidate target signal which approximates the noise distribution around the weak candidate weak target signal using a local noise window and which uses the histogram to set threshold values for the adaptive thresholding process;
  - b) extract a wave profile of a center beam signal of a weak candidate target signal and adjacent beam signals of the weak candidate target signal using a local signal profile window;
  - c) determine cross-beam correlations between an extracted wave profile of the center beam signal and extracted wave profiles of the adjacent beam signals and determining correlations between extracted wave profiles of adjacent beam signal profiles based on the similarity of the wave profiles to determine the occurrence of a weak target signal in the adjacent beam signals to compute a set of weighting factors;
  - d) enhance the center beam signal of the weak target signal based on the said correlations and said set of weighting factors; and
  - e) repeat steps b) through d) for each of the weak candidate target signals to provide enhanced weak target signals.

37. A system for enhancing weak target signals for a sensor array comprising:
- a pre-processing engine comprising a computer program embodied on a non-transitory computer readable storage medium, the pre-processing engine responsive to buffer data from a sensory array and configured to:
  - a) determine the locations of weak candidate target signals using one or more adaptive thresholding processes which includes an adaptive thresholding process which uses a set of noise samples from a noise window around the weak candidate target signal to estimate a high order statistic of the noise samples and which uses the estimate to set threshold values for the adaptive thresholding process;
  - b) extract a wave profile of a center beam signal of a weak candidate target signal and adjacent beam signals of the weak candidate target signal using a local signal profile window;
  - c) determine cross-beam correlations between an extracted wave profile of the center beam signal and extracted wave profiles of the adjacent beam signals and determining correlations between extracted wave profiles of adjacent beam signal profiles based on the similarity of the wave profiles to determine the occurrence of a weak target signal in the adjacent beam signals to compute a set of weighting factors;
  - d) enhance the center beam signal of the weak target signal using said correlations and said set of weighting factors; and
  - e) repeat steps b) through d) for each of the weak candidate target signals to provide enhanced weak target signals.

\* \* \* \* \*